Figures 1, 2:
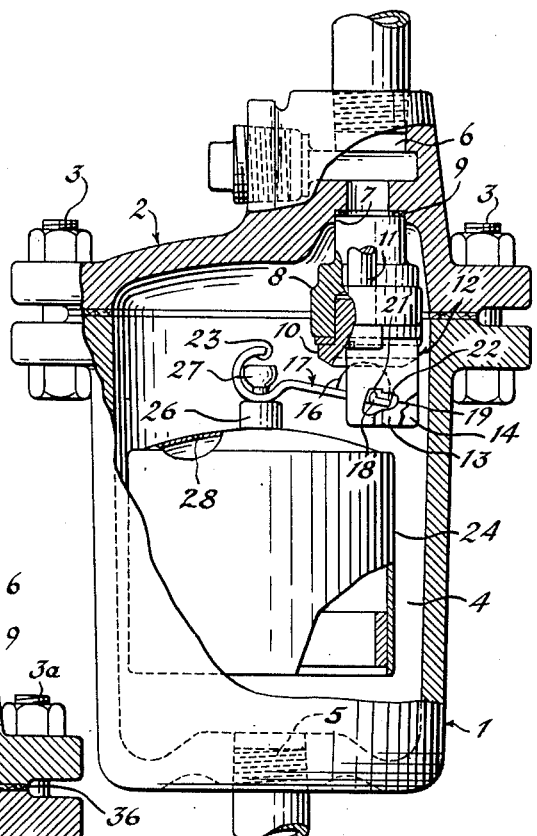

Nov. 10, 1953 W. S. GOFF 2,658,517
VAPOR TRAP
Filed Jan. 26, 1950

INVENTOR
William S. Goff
BY Evans & McCoy
ATTORNEYS

Patented Nov. 10, 1953

2,658,517

UNITED STATES PATENT OFFICE 2,658,517

VAPOR TRAP

William S. Goff, Cleveland, Ohio, assignor to The Clark Manufacturing Company, Cleveland, Ohio, a corporation of Ohio Application January 26, 1950, Serial No. 140,639

4 Claims. (Cl. 137—190)

This invention relates to fluid traps such as steam traps and particularly to fluid traps of the so-called "open bucket" type. In this type of trap the bucket or float is open at its upper end to permit the liquid accumulating in the trap periodically to flow over the rim of the bucket and into the bucket for reducing its buoyancy and causing it to sink and open a discharge valve.

A number of different types of fluid traps are required to meet the many different operating conditions encountered in vapor systems; and each type of trap must be made in a large range of sizes to handle widely varying quantities of liquids and gases at different pressures in vapor systems of all kinds and sizes. As a result, the manufacturer of fluid traps has been compelled to make and stock a large number of sizes of each of several different types of traps in order to be in a position to furnish the proper trap for any operating condition that may be encountered.

Two commonly used types of fluid traps are the so-called "open bucket" and "inverted bucket" types. Because of the radical difference in the mode of operation of these two types of traps, the designs for their housings, as well as their interior operating parts, have differed substantially from each other. Few, if any, parts of one of these types of traps have been interchangeable with corresponding parts of the other. This lack of interchangeability of parts has been due lagely to inability of trap manufacturers to design satisfactory traps of these two types, with corresponding pressure and capacity ratings, while employing many interchangeable parts in the two types of designs.

The principal object of the present invention is to provide a design for an open bucket trap which may employ most of the parts of an inverted bucket trap having substantially the same pressure and capacity ratings.

More specifically, it is an object of the invention to provide a design for an open bucket trap which may employ the same housing elements and the same discharge valve as an inverted bucket trap of the same pressure and capacity ratings.

A feature of the invention resides in the adaptability of the two housing elements and the valve mechanism of an inverted bucket trap for use in combination with an additional housing element and an open bucket and connector, whereby the inverted bucket trap may be converted to an open bucket trap by substituting only the bucket and connector of one type for the other, and by adding to the structure a single additional housing element.

Other objects and advantages of the invention will become apparent from the following specification and from the accompanying drawing illustrating a preferred embodiment of the invention.

In my copending application for Vapor Traps, Serial No. 126,227, filed November 8, 1949, I disclosed and claimed a new and improved vapor trap of the inverted bucket type and a new and improved valve mechanism for vapor traps generally. In that application, I also disclosed an open bucket trap embodying the present invention for the purpose of illustrating the adaptability of the valve mechanism for use in different types of vapor traps. The present invention will be illustrated herein by the same type of open bucket trap disclosed in my above-mentioned copending application. Thus, this application is a continuation-in-part of my copending application Serial No. 126,227.

For convenience in illustrating the interchangeability of parts between the two types of traps, both are shown in the drawing, though the novelty of the invention resides essentially in the combination of structural features present only in the open bucket type of trap.

Referring to the drawing, Figure 1 is a side elevation of a vapor trap of the inverted bucket type shown in my above mentioned copending application, a portion of the housing being broken away to show the arrangement of the interior operating parts; and Fig. 2 is a side elevation of a vapor trap of the open bucket type embodying most of the essential parts of the inverted bucket trap shown in Fig. 1, a portion of the housing of the open bucket trap also being broken away to show the construction and arrangement of the interior operating parts.

Referring first to Fig. 1, a trap of the inverted bucket type may include a cup-shaped lower housing member 1 and a separable housing member 2 secured to the lower housing member by means of bolts 3 to form a cap therefor and to define an enclosed condensate chamber 4. The condensate chamber 4, which is normally full of liquid, is provided with a steam and condensate inlet 5 in the bottom thereof, and the cap housing member 2 defines an opening 6 through which condensate and accumulated gases may be discharged.

Inside the chamber 4, the cap 2 is provided with a counterbore 7 concentric with the discharge opening 6 and of greater diameter for receiving the upper end of a valve housing 8. A gasket 9 is disposed between the upper end of the valve housing 8 and the upper end of the counterbore 7, and an outwardly flanged orifice sleeve 10, defining a circular valve seat, is inserted into the valve housing with a press fit. The valve housing 8 is secured to the cap 2 by means of a plurality of oppositely disposed bolts 11 (only one being shown).

The base of a yoke 12, having a pair of downwardly extending arms 13 and 14, surrounds the orifice sleeve 10 and is held rigidly against the valve housing 8 by a flange on the orifice sleeve. The yoke arms 13 and 14 are spaced apart and straddle the orifice sleeve 10.

A movable valve element 16, having a spherical surface normally engaging the valve seat, is provided with a valve actuating lever 17. The valve element 16 is normally held against the valve seat by the pressure within the vapor trap and is rotatable through a limited angle on the valve seat by movement of the valve lever 17. For moving the valve element 16 away from the valve seat, the valve lever is provided with a pair of laterally extending trunnions 18 (only one being shown) that respectively project through apertures 19 (only one being shown) in the yoke arms 13 and 14, respectively. Each of the trunnions 18 is provided with two spaced-apart bearing surfaces or edges 21 and 22 that successively engage the upper edge of the adjacent aperture 19 as the valve lever 17 is further rotated for moving the valve element 16 away from the valve seat. The details of the valve construction, briefly described above, are disclosed and claimed in my above-mentioned copending application. Since these details form no part of the present invention, they are disclosed herein only sufficiently for an understanding of the general mode of operation of the traps illustrated, reference being made to my above-mentioned copending application for a more complete description of the valve actuating mechanism.

The opposite end of the valve lever 17 from the valve element 16 is deformed to provide a generally cylindrical socket 23 to which an inverted bucket 24 is pivotally attached by means of a suitable connecting device 26 having an enlarged upper end 27. The connecting device 26 is preferably of the type which will provide a variable vent in the top of the bucket 24. Various variable vent connectors may be employed for this purpose and the details thereof need not be shown herein. A preferred form of connector is disclosed in detail in my above-mentioned copending application.

The socket end of the lever 17 is bifurcated to provide a longitudinally extending slot (not shown) that accommodates a reduced neck of the connecting device below its upper end 27. The connector is thus suspended from the socket 23 in a manner permitting free swinging movement of the connector about an axis parallel to the cylindrical axis of the socket 23.

The bucket 24 comprises a cylindrical shell having an open lower end and a closed upper end. The closed upper end may desirably be provided with a small auxiliary vent 28 in addition to the variable vent provided by the connector 26.

When initially installing the vapor trap of Fig. 1 in a vapor system, the trap is preferably primed so that the chamber 4 is full of liquid. When the trap housing elements are secured together with the bucket and valve mechanism suspended inside the trap, the bucket will drop to the bottom of the trap until the vapor system is placed in operation. When the vapor system is turned on and vapor begins to bubble through the inlet 5, the vapor accumulates in the bucket at a faster rate than it is vented through the bucket top, thus causing the bucket to become buoyant and rise in the chamber to the position shown in Fig. 1. This raises the valve element 16 into engagement with the valve seat where it is thereafter held by the pressure within the trap, except when forcibly opened by sinking of the bucket 24.

Considering the trap of Fig. 1 as being connected to a steam system in the customary manner, and starting with the bucket 24 in its uppermost position and with the valve element 16 closing the valve seat as shown in the drawing, the chamber 4 will be substantially full of water, but the bucket 24 will have a substantial gas space above the water level therein. In due course, by reason of the escape of gases through the bucket vent and the condensation of steam above the water level within the bucket, the water rises inside the bucket and causes it to lose buoyancy and sink. Sinking of the bucket rotates the valve lever 17 first about the valve element 16 as the bucket gathers momentum, and then about the fulcrum edges 21 and 22 successively to move the valve element away from its seat and permit water to be forced through the outlet 6 and out of the system.

As water and accumulated gases flow out through the outlet opening 6, additional gases and steam flow through the inlet 5 and into the inverted bucket at an increasing rate and collect in the upper part of the bucket faster than they are vented through the top of the bucket. The water level in the bucket is rapidly forced downwardly in the bucket by the accumulation of gases in the upper part of the bucket, and the bucket regains buoyancy and rises, thus returning the valve element to its closed position.

The detailed operation of this type of trap is also more fully disclosed in my above-mentioned copending application and need not be discussed at greater length herein for an understanding of the present invention.

Turning now to the open bucket type of trap shown in Fig. 2, it will be observed that the trap housing includes the same lower housing member 1 and upper housing member 2 that were employed in the inverted bucket trap of Fig. 1. In this embodiment of the invention, the lower housing member 1 has the inlet opening 5 in the bottom thereof closed by a plug 31. The upper housing member 2, however, has the same outlet arrangement as the corresponding housing member in Fig. 1 and includes the valve housing 8 held in the counterbore 7 against a gasket 9 by means of bolts 11. The valve housing 8 carries the same orifice sleeve 10 and yoke 12, and the same valve element 16 and valve lever 17 are mounted in the yoke 12 for opening and closing the orifice.

In order to divide the interior of the trap into two compartments and to provide the additional trap height required for an open bucket trap, an intermediate housing member 32 is provided. The intermediate housing member 32 serves as a spacing element between the lower housing member 1 and the upper housing member 2, and it is shaped to provide a partition 33 that divides the interior of the trap into a lower, liquid-collecting chamber 34 and an upper chamber 35. Suitable gaskets 36 are disposed respectively between the lower and intermediate housing members 1 and 32 and between the upper and intermediate housing members 2 and 32. The three housing sections may be held firmly together by suitable bolts 3a that are long enough to extend through flanges in all three housing sections.

The partition 33 has a relatively large opening 37 therethrough, and a vertically disposed tube 38 has its upper end secured to the partition in communication with the opening 37. While the partition 33 is shown as being integrally formed with the intermediate housing member 32, it is obvious that the partition may be separately formed, if desired, and secured to the intermediate housing member in any convenient manner. Also while the tube 38 is shown as being formed separately from the partition 33 and secured thereto by a threaded connection, it is obvious that the tube may, if desired, be formed integrally with the partition.

The intermediate housing member 32 has an inlet opening 39 through the wall thereof below the partition 33 for admitting condensate and gases into the lower chamber 34. A baffle 41 is provided opposite the opening 39 for deflecting the entering liquid outwardly against the wall of the lower housing 1 as it falls into the lower chamber 34. The baffle 41 may be secured to the partition 33 in any convenient manner, as by a screw, or it may be formed integrally with the partition. A relatively small vent opening 42 is also provided in the intermediate housing member, preferably being formed in the partition 33, for equalizing the pressures in the lower and upper chambers 34 and 35.

A bucket 43 is disposed in the lower chamber 34 with the tube 38 projected downwardly into the bucket, and the bucket is connected to the valve lever 17 by means of a rod 44 formed to provide a reduced neck 46 and a head 47 at its upper end for suspending the rod from the valve socket 23. The lower end of the rod 44 terminates in a threaded portion 48 of reduced diameter that projects through a washer 49 and gasket 51 and through the bottom of the bucket. A nut 52 is threaded onto the end of the rod below the bucket to effect a reasonably water-tight, rigid connection between the rod 44 and the bucket.

Under normal operating conditions there is sufficient water in the condensate chamber 34 of the vapor trap of Fig. 2 to support the bucket 43 in its uppermost position shown in the drawing. As additional condensate collects in the chamber 43, the water level rises therein until it overflows into the bucket. When the level in the bucket rises to the approximate height indicated by the arrow A in Fig. 2, the bucket sinks and actuates the valve lever 17 to open the discharge valve by moving the valve element 16 away from its seat in substantially the same manner previously described in connection with the vapor trap of Fig. 1. By reason of the small size of the vent opening 42, the pressure tends to drop more rapidly in the upper chamber 35 than in the condensate collecting chamber 34 when the outlet valve is open, and the water in the bucket is forced upwardly through the tube 38 filling the upper chamber 35 and discharging through the outlet opening 6, until the level in the lower chamber drops to the upper rim of the bucket and the level within the bucket approaches the lower end of the tube 38. This reduction of the quantity of liquid in the bucket increases its buoyancy, and before the liquid level therein drops as far as the lower end of the tube 38, the bucket again reaches its uppermost position, closing the discharge valve in the process of rising and completing the cycle of operation.

From the foregoing description of the inverted bucket and open bucket types of vapor traps it will be apparent that I have provided a design for an open bucket trap capable of utilizing all of the parts of the inverted bucket design except for the bucket itself and the connector for attaching the bucket to the valve lever. This greatly reduces the number of different parts that must be manufactured and stocked by the trap manufacturer. It will also be apparent that either type of trap, in service, may readily be converted into the other type of trap by the substitution of a relatively few number of parts. In changing an inverted bucket trap to an open bucket trap, for example, it is merely necessary to supply an intermediate housing member 32, a new bucket 43 and connecting rod 44, and a plug 41 for the bottom of the lower housing 1. The condensate supply line is connected to the inlet opening 39 in the intermediate housing 32 instead of being connected to the bottom of the lower housing 1, but in all other respects, even the connecting conduits remain unchanged.

While the invention has been illustrated with reference to the particular trap designs disclosed in my above-mentioned copending application, Serial No. 126,227, it will be appreciated that the invention is not limited to the details of that design except as required by the appended claims. Many variations in the structural details shown may be made by those skilled in the art without departing from the true spirit and scope of the invention.

Having described the invention in detail, I claim:

1. A fluid trap comprising a lower cup-shaped member defining an upwardly opening liquid-collecting chamber and having a flat annular seat about its upper open end, a valve-actuating float disposed in said cup-shaped member, an upper housing member defining an outlet orifice and having a downwardly facing flat annular seat, a valve mounted on said upper housing member for opening and closing said orifice, and an intermediate housing member of generally cylindrical configuration about a vertical axis, said intermediate housing member having a downwardly facing flat annular seat about its lower end and an upwardly facing flat annular seat about its upper end and having its lower and upper flat annular seats respectively disposed in sealing relationship with said flat annular seats of said lower and upper housing members, said intermediate housing member including a generally transversely extending partition spaced from said upper housing member for defining an upper chamber therebetween and for separating said upper chamber from said liquid-collecting chamber, means acting through said partition for actuating said valve to open and close said orifice in response to vertical movement of said float, said flat annular seats of said upper and lower housing member being of substantially the same size so that they may be disposed in sealing relationship with each other when said intermediate housing member is removed from the assembly.

2. A fluid trap comprising a lower cup-shaped member defining an upwardly opening liquid-collecting chamber and having a flat annular seat about its upper open end, a valve-actuating float disposed in said cup-shaped member, an upper housing member defining an outlet orifice and having a downwardly facing flat annular seat, a valve mounted on said upper housing member for opening and closing said orifice, and an intermediate housing member of generally cylindrical configuration about a vertical axis, said intermediate housing member having a downwardly facing flat annular seat about its lower end and an upwardly facing flat annular seat about its upper end and having its lower and upper flat annular seats respectively disposed in sealing relationship with said flat annular seats of said lower and upper housing members, said intermediate housing member including a generally transversely extending partition spaced from said upper housing member for defining an upper chamber therebetween and for separating said upper chamber from said liquid-collecting chamber, means acting through said partition for actuating said valve to open and close said orifice in response to vertical movement of said float, said flat annular seats of said upper and lower housing member being of substantially the same size so that they may be disposed in sealing relationship with each other when said intermediate housing member is removed from the assembly, said lower and upper housing members being provided with circumferential flanges having aligned bolt receiving openings whereby said flanges may be connected by bolts to draw the lower and upper housing members together with or without the intermediate housing member disposed therebetween.

3. A fluid trap comprising a lower cup-shaped member defining an upwardly opening liquid-collecting chamber and having a flat annular seat about its upper open end, a valve-actuating float disposed in said cup-shaped member, an upper housing member defining an outlet orifice and having a downwardly facing flat annular seat, a valve mounted on said upper housing member for opening and closing said orifice, and an intermediate housing member of generally cylindrical configuration about a vertical axis, said intermediate housing member having a downwardly facing flat annular seat about its lower end and an upwardly facing flat annular seat about its upper end and having its lower and upper flat annular seats respectively disposed in sealing relationship with said flat annular seats of said lower and upper housing members, said intermediate housing member including a generally transversely extending partition spaced from said upper housing member for defining an upper chamber therebetween and for separating said upper chamber from said liquid-collecting chamber and having a liquid inlet opening into said liquid-collecting chamber below said partition, means acting through said partition for actuating said valve to open and close said orifice in response to vertical movement of said float, said flat annular seats of said upper and lower housing member being of substantially the same size so that they may be disposed in sealing relationship with each other when said intermediate housing member is removed from the assembly.

4. A fluid trap comprising a lower cup-shaped member defining an upwardly opening liquid-collecting chamber and having a flat annular seat about its upper open end, a valve-actuating float disposed in said cup-shaped member, an upper housing member defining an outlet orifice and having a downwardly facing flat annular seat, a valve mounted on said upper housing member for opening and closing said orifice, and an intermediate housing member of generally cylindrical configuration about a vertical axis, said intermediate housing member having a downwardly facing flat annular seat about its lower end and an upwardly facing flat annular seat about its upper end and having its lower and upper flat annular seats respectively disposed in sealing relationship with said flat annular seats of said lower and upper housing members, said intermediate housing member including a generally transversely extending partition spaced from said upper housing member for defining an upper chamber therebetween and for separating said upper chamber from said liquid-collecting chamber and having a liquid inlet opening into said liquid-collecting chamber below said partition, means acting through said partition for actuating said valve to open and close said orifice in response to vertical movement of said float, said flat annular seats of said upper and lower housing members being of substantially the same size so that they may be disposed in sealing relationship with each other when said intermediate housing member is removed from the assembly, said lower and upper housing members being provided with circumferential flanges having aligned bolt receiving openings whereby said flanges may be connected by bolts to draw the lower and upper housing members together with or without the intermediate housing member disposed therebetween.

WILLIAM S. GOFF.

References Cited in the file of this patent

UNITED STATES PATENTS

| Number | Name | Date |
| --- | --- | --- |
| 1,183,025 | Morrison | May 16, 1916 |
| 1,805,064 | Yarnell | May 12, 1931 |
| 1,960,999 | Kaye | May 29, 1934 |
| 1,966,007 | Flood | July 10, 1934 |

FOREIGN PATENTS

| Number | Country | Date |
| --- | --- | --- |
| 13,656 | Great Britain | of 1891 |
| 60,717 | Germany | of 1892 |
| 150,257 | Great Britain | of 1920 |